March 25, 1969 A. CSICSATKA 3,435,144
CROSS-TALK COMPENSATION FOR STEREO RECEIVERS
Filed Oct. 22, 1965
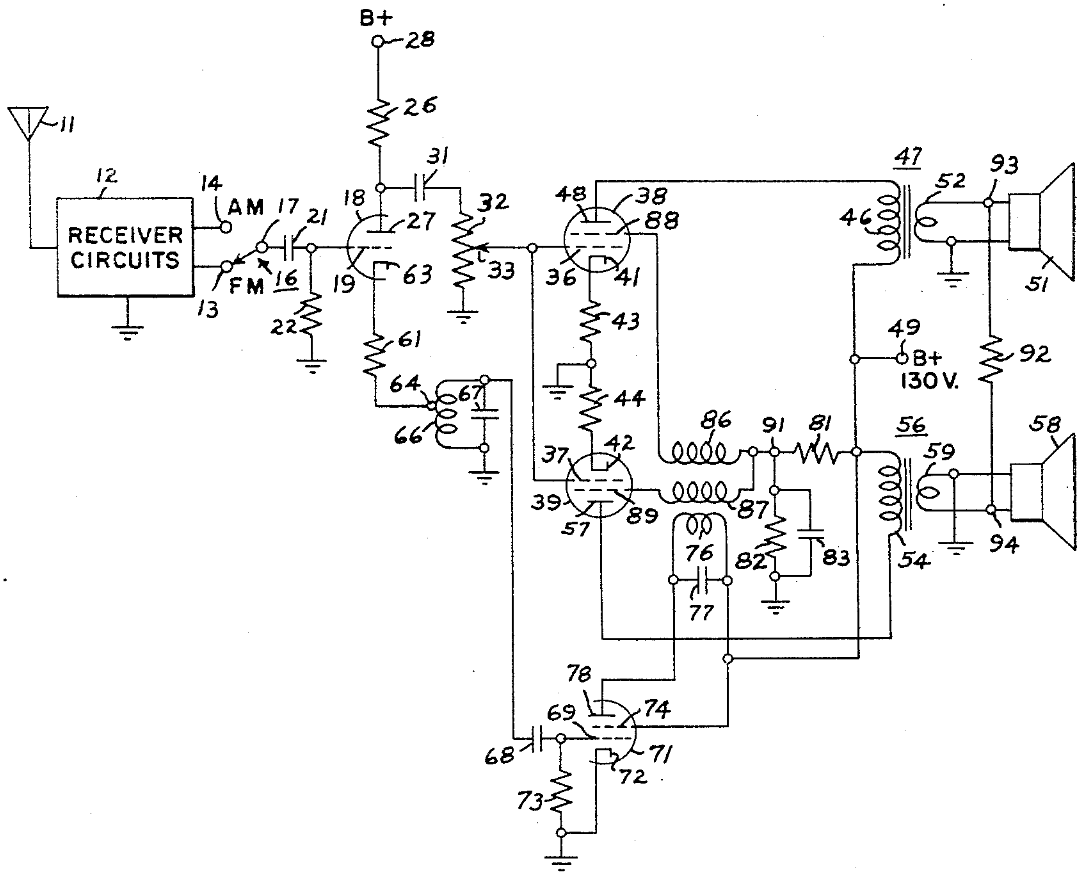
INVENTOR:
ANTAL CSICSATKA,
BY Norman C. Fulmer
HIS ATTORNEY.

United States Patent Office 3,435,144

Patented Mar. 25, 1969

3,435,144

CROSS-TALK COMPENSATION FOR STEREO RECEIVERS

Antal Csicsatka, Utica, N.Y., assignor to General Electric Company, a corporation of New York Filed Oct. 22, 1965, Ser. No. 501,414
Int. Cl. H04m *1/00;* H04j *1/12, 3/10*
U.S. Cl. 179—1 3 Claims

ABSTRACT OF THE DISCLOSURE

A cross-talk compensation circuit for a stereo receiver comprising a single resistor connected between oppositely phased ends of corresponding signal-coupling windings in the two channels.

This invention relates to cross-talk compensation circuits for use in stereo radio receivers.

Conventional stereo radio receivers employ standard circuits for receiving and remodulating the broadcast modulated carrier wave, followed by a stereo demodulator circuit for deriving the L ("left") and R ("right") stereo audio signals. These L and R signals are amplified, if required, and fed to L and R loudspeakers, respectively. Usually a certain amount of "cross-talk" is present in the L and R signals—that is, the L signal is accompanied by an undesired small amount of the R signal, and the R signal is accompanied by an undesired small amount of the L signal. Due to this undesired cross-talk, the stereo result is not as effective and enjoyable as is usually desired. The aforesaid cross-talk is usually caused by slight unbalances or imperfections in the stereo demodulator circuit.

Various ways have been devised to compensate or cancel the undesired cross-talk. One way, as shown in FIGURE 6 and described in columns 9 and 10 of U.S. Patent 3,068,323, issued to Robert B. Dome and assigned to the same assignee as the present patent application, involves the use of resistors arranged to cross-couple the L and R audio amplifiers such that the L signal and its accompanying R cross-talk is applied to the R audio channel, and the R signal and its accompanying L cross-talk is applied to the L channel, in suitable amplitude and phase or polarity so that the undesired cross-talk components become cancelled. Two resistors are required for this cross-coupling, in order to apply the signals from each channel to a proper point in the other channel to provide the required opposite phase for cancellation of the cross-talk components.

An object of the invention is to provide an improved cross-talk compensation circuit for stereo receivers.

Another object is to provide a cross-talk compensation circuit for stereo receivers which is simple and economical to manufacture.

An additional object is to provide cross-talk compensation at the loudspeakers, and after the amplifier channels, of a stereo arrangement.

Further objects will be apparent from the following description and claims, and from the accompanying drawing.

The improved cross-talk compensation circuit of the invention comprises, briefly and in a preferred embodiment, a resistor connected between an end of the audio transformer output winding of one stereo channel and the oppositely phased end of the audio transformer output winding of the other stereo channel.

In the drawing, the single figure is an electrical schematic diagram of a preferred embodiment of the invention.

An antenna 11 picks up the FM stereo signal in conventional manner, and applies it to receiver circuits 12 which normally include, for reception of FM signals, a mixer circuit, intermediate frequency amplifier stages, and a demodulator of the limiter-discriminator type or ratio-detector type. The output of the receiver circuits 12 at the FM output terminal 13, when FM stereo is received, comprises the standard composite signal in the form of an $L+R$ component in a range of some 50 to 15,000 cycles per second, a pilot signal at 19 kc. per second, and $L-R$ side bands of a suppressed amplitude modulated subcarrier, these side bands extending between 23 kc. per second and 53 kc. per second.

The receiver circuits 12 also may comprise conventional AM circuitry which may include a mixer circuit, an intermediate frequency amplifier circuit, and an AM detector, the output of which provides that the modulated monaural audio signal at the AM output terminal 14. If desired, some of the AM and FM circuitry in the receiver circuits 12 may constitute dual-functioning circuitry.

A switch 16 alternatively connects a terminal 17 to the FM output terminal 13 and the AM output terminal 14. An amplifier device 18 which is shown as comprising a vacuum tube, has a grid input electrode 19 connected via a coupling capacitor 21 to the terminal 17. A resistor 22 is connected between the grid 19 and electrical ground. A resistor 26 is connected between the anode 27 of tube 18 and a terminal 28 of operating voltage. A coupling capacitor 31 is connected between the anode 27 and one end of a volume control potentiometer 32, the other end thereof being electrically grounded. An adjustable tap 33 of the volume control 32 is connected to input grid electrodes 36 and 37 of a pair of screen grid amplifier tubes 38 and 39. The cathodes 41 and 42 of these amplifier tubes are respectively connected to electrical ground via biasing resistors 43 and 44. The tubes 38 and 39 respectively constitute time-sampling switching devices for deriving the left and right stereo signals from the incoming composite signal, and also amplify the derived left and right signals.

A primary winding of 46 of an output transformer 47 is connected between the anode 48 of tube 38 and a terminal 49 of suitable operating voltage for the tubes 38 and 39. A loudspeaker 51, which may be for reproduction of the "left" output signal, is connected to a secondary winding 52 of the audio output transformer 47. Similarly, a primary winding 54 of an output transformer 56 in the other channel is connected between the voltage terminal 49 and the anode 57 of the tube 39, and a loudspeaker 58, which may be for the "right" stereo signal, is connected to a secondary winding 59 of the audio output transformer 56.

A resistor 61 is connected between the cathode 63 of the composite signal amplifier tube 18 and a tap 64 of an inductor 66. A capacitor 67 is connected in parallel with the inductor 66, to provide therewith a resonant circuit tuned to the 19 kc. frequency of the pilot signal, thereby to select the pilot signal from the other components of the stereo composite signal. An end of the inductor 66 is electrically grounded, and the other end is coupled via a capacitor 68 to an input grid 69 of a frequency doubler tube 71. The cathode 72 of tube 71 is electrically grounded, and a resistor 73 is connected between the grid 69 and electrical ground. A screen grid 74 is connected to the voltage terminal 49, and an inductor 76 and capacitor 77 are connected in parallel between the screen grid 74 and the anode 78 of the frequency doubler tube 71. The inductor 76 and capacitor 77 constitute a resonant circuit tuned to be resonant at the 38 kc. frequency of the side-band reference wave, and tube 71 functions to amplify the 19 kc. pilot signal and apply it to the 38 kc. resonant circuit 76–77, whereupon a 38 kc.

reference wave or switching signal becomes generated in the resonant circuit 76–77.

A pair of resistors 81 and 82 are connected in series between the voltage terminal 49 and electrical ground and a filter capacitor 83 is connected across the resistor 82.

Secondary windings 86 and 87 are respectively connected between the screen grids 88 and 89 of the amplifier output tubes 38 and 39, and the junction 91 of the voltage dropping resistors 81 and 82. In effect, these windings 86 and 87 are a single center tapped winding. The voltage dropping resistors 81 and 82 provide, at the junction terminal 91, a voltage value approximately half the value required for fall amplification by the tubes 38 and 39, and the secondary windings 86 and 87 which are inductively coupled to the 38 kc. resonant circuit inductor 78, apply to the screen grids alternately and oppositely phased 38 kc. switching signals for alternately switching the amplifier tubes 38 and 39 on and off in an alternating sequence so that one of the stereo signals, for example the L signal, is derived by the switching action of tube 38, amplified, and applied to the output transformer 47 and loudspeaker 51. Similarly, the switching action by tube 39 derives the other signal, for example the R signal, by the time sampling process, and amplifies the signal whereupon it is applied to the output transformer 56 and loudspeaker 58. The aforesaid circuitry for deriving the L and R stereo signals from the composite input signal, is more fully described, and claimed, in copending patent application Ser. No. 460,364, filed June 1, 1965 now Patent No. 3,351,712 issued Nov. 7, 1967 and assigned to the same assignee as in the present patent application. If desired, other stereo demodulator circuitry may be employed.

In accordance with the present invention, a resistor 92 is connected between the upper end 93 of the output winding 52, and the lower end 94 of the output winding 59. The remaining ends of these output windings are electrically grounded, as shown.

In the example shown, the signal appearing at the point 93 in the "left" channel, is $(L+r)$ in which L is the desired "left" signal and $r$ is the undesired cross-talk. The signal appearing at the point 94 in the "right" channel is $-(R+l)$ in which R is the desired "right" signal and "$l$" is the undesired cross-talk from the "left" signal. The resistor 92 has a value so as to cross-couple a small amount of these signals from each channel to the other so that the $r$ cross-talk component in the "left" channel at point 93 is cancelled out by the −R component applied to point 93 via the resistor 92 from point 94. Of course, the small component of "$-l$" fed from point 94 via resistor 92 to point 93 will slightly reduce the desired L signal magnitude. Similarly, the undesired cross-talk component "$-l$" at point 94 is cancelled out by the small amount of L applied thereto via resistor 92 from the point 93. Of course, the accompanying very small component of $r$ applied to point 94 from point 93 slightly reduces the desired value of R signal at the point 94. Thus, it will be seen that the resistor 92 accomplishes simultaneously cancellation of the undesired cross-talk components $r$ at point 93 and $-l$ at point 94 while at the same time insignificantly reducing the amplitudes of the desired signal L at point 93 and desired signal −R at point 94. Of course, the polarities of the signals involved may all be reversed without affecting the functioning of the invention.

By connecting the resistor 92 as shown, e.g., from the top end of one output winding to the bottom end of the other output winding, the required signal polarities are obained for cross-talk cancellation, without affecting the desired proper phasing of the left loudspeaker 51 and right loudspeaker 58. The foregoing cross-talk cancellation is achieved by the addition of a single low-cost resistor to the circuitry, externally of any amplifier circuits, and preferably at the loudspeakers which is conveniently achieved without involving any chassis circuitry.

While a preferred embodiment of the invention has been shown and described, various other embodiments and modifications thereof will be apparent to those skilled in the art and will fall within the scope of invention as defined in the following claims.

What I claims is:

1. A cross-talk compensation circuit comprising two stereo channels each provided with a signal-coupling winding, and a resistor connected between an end of one of said windings and the oppositely phased end of the other of said windings, said resistor having a value of resistance to cause cancellations of cross-talk in each of said two channels.

2. A cross-talk compensation circuit comprising two stereo audio amplifier channels each provided with an output winding adapted to be connected to a loudspeaker, and a resistor connected between an end of one of said windings and the oppositely phased end of the other of said windings, said resistor having a value of resistance to cause cancellation of cross-talk at each of said output windings.

3. A cross-talk compensation circuit for a stereo arrangement having first and second two-terminal loudspeakers respectively connected to stereo signal sources, comprising a resistor connected between one of said terminals of the first loudspeaker and the terminal of the second loudspeaker at which the stereo signal and accompanying cross-talk component are oppositely phased from the stereo signal and accompanying cross-talk component at said one terminal at the first loudspeaker, and means connecting together the remaining terminals of said loudspeakers, said resistor having a value of resistance to cause cancellation of the cross-talk components at each of said loudspeakers.

References Cited

UNITED STATES PATENTS 2,481,911 9/1949 De Boer et al. -------- 179—1.3
3,117,186 1/1964 Burden et al.

KATHLEEN H. CLAFFY, *Primary Examiner.*

V. C. WILKS, *Assistant Primary.*

U.S. Cl. X.R.

179—15